United States Patent [19]

Chizat

[11] Patent Number: 4,978,701

[45] Date of Patent: Dec. 18, 1990

[54] DIORGANOPOLYSILOXANES CONTAINING ITACONATE FUNCTIONAL GROUPS

[75] Inventor: Francois Chizat, Bron, France

[73] Assignee: Rhone-Poulenc Chimie, Courbevoie, France

[21] Appl. No.: 349,822

[22] Filed: May 10, 1989

[30] Foreign Application Priority Data

May 10, 1988 [FR] France ................. 88 06558

[51] Int. Cl.$^5$ .............................................. C08K 5/24
[52] U.S. Cl. .................................... 524/265; 524/264; 524/266; 524/269; 528/15; 528/26; 528/31
[58] Field of Search ............................ 528/15, 26, 31; 524/264, 265, 266, 269

[56] References Cited

U.S. PATENT DOCUMENTS

| | | | |
|---|---|---|---|
| 4,101,492 | 7/1978 | Lindemann et al. | 260/29.6 |
| 4,405,469 | 9/1983 | Hafner et al. | 252/28 |
| 4,647,683 | 3/1987 | Manis et al. | 556/440 |

FOREIGN PATENT DOCUMENTS 10558022  5/1964  United Kingdom .

*Primary Examiner*—Melvyn I. Marquis
*Attorney, Agent, or Firm*—Burns, Doane, Swecker & Mathis

[57] ABSTRACT

Diorganopolysiloxanes containing itaconate functional groups include at least one recurring structural unit of the formula (1):

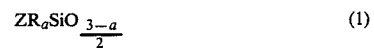

in which a is 1 or 2; the symbol Z is one of the radicals —CH$_2$CH(COOR')CH$_2$COOR' and —C(CH$_3$)-(COOR')CH$_2$COOR'; the symbols R, which may be identical or different, are each a C$_1$–C$_{20}$ alkyl, vinyl, phenyl or 3,3,3-trifluoropropyl radical, and, in the case where a=2, one of the radicals R may be a hydroxyl group; and the symbols R', which may be identical or different, are each a C$_1$–C$_{12}$ monovalent hydrocarbon radical or a C$_2$–C$_{12}$ monovalent alkoxyalkyl radical, and are useful, e.g., as PVC lubricants and hydraulic fluids; they are facilely prepared by hydrolysis/polycondensation or by hydrosilylation.

12 Claims, No Drawings

DIORGANOPOLYSILOXANES CONTAINING ITACONATE FUNCTIONAL GROUPS

BACKGROUND OF THE INVENTION

1. Field of the Invention

The present invention relates to novel diorganopolysiloxanes comprising an itaconate functional group and to the use of such novel diorganopolysiloxanes, particularly as lubricants for PVC (polyvinyl chloride) compositions and as hydraulic fluids.

2. Description of the Prior Art

U.S. Pat. Nos. 4,207,246, 4,322,473 and 4,405,469 describe polyorganosiloxanes modified with an organic moiety including a succinate functional group and their use as a lubricant for textile fibers, for metal surfaces and as hydraulic fluids.

L. Goodman, in *J.A.C.S.*, 79, 3073 (1957), describes the addition of organohydrochlorosilanes to ethylenically unsaturated organic monomers such as vinyl acetate and allyl acetate. The addition products are then hydrolyzed to give oils or, after heating, solid resins.

The Goodman article does not describe the addition of itaconate to an organohydrodichlorosilane or to an organohydrochlorosilane; only hydrotrichlorosilanes are featured.

Furthermore, the addition reaction of an ethylenically unsaturated organic monomer to a hydrosilane or to a hydropolysiloxane is well known to this art and is described, for example, in U.S. Pat. Nos. 3,317,369, 3,258,477 and 4,160,775.

The prior art, however, is conspicuously devoid of any reference to a diorganopolysiloxane polymer containing an itaconate functional group which exhibits such notable properties as a lubricant for PVC and as a hydraulic fluid.

SUMMARY OF THE INVENTION

Accordingly, a major object of the present invention is the provision of novel diorganopolysiloxane polymers comprising, per molecule, at least one recurring structural unit of the formula:

$$ZR_aSiO_{\frac{3-a}{2}} \qquad (1)$$

in which a is 1 or 2; the symbol Z is one of the radicals -CH$_2$CH(COOR')CH$_2$COOR' and -C(CH$_3$)(COOR')CH$_2$COOR'; the symbols R, which may be identical or different, are each a C$_1$–C$_{20}$ alkyl, vinyl, phenyl or 3,3,3-trifluoropropyl radical, and, in the case where a=2, one of the radicals R may be a hydroxyl group; and the symbols R', which may be identical or different, are each a C$_1$–C$_{12}$ monovalent hydrocarbon radical or a C$_2$–C$_{12}$ monovalent alkoxyalkyl radical.

DETAILED DESCRIPTION OF THE PREFERRED EMBODIMENTS OF THE INVENTION

More particularly according to the present invention, the "other" siloxy recurring units of the subject novel diorganopolysiloxanes preferably have the formula:

$$R_bSiO_{\frac{4-b}{2}} \qquad (1')$$

in which R is defined as above and b is equal to 2 or 3.

The diorganopolysiloxanes according to this invention are preferably linear or cyclic polymers having the following formulae (2) and (3):

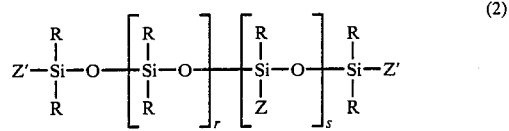
(2)

in which the symbols R and Z are as defined above; the symbols Z', which may be identical or different, are each a radical R or Z; r is an integer ranging from 0 to 500, inclusive; s is an integer ranging from 0 to 50, inclusive, and, if s is 0, at least one of the symbols Z' is Z; and

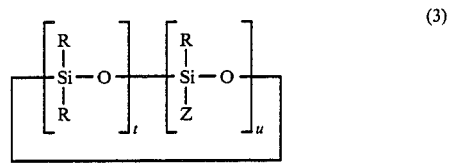
(3)

in which R and Z are as defined above; u is an integer ranging from 1 to 20, inclusive; t is an integer ranging from 0 to 20, inclusive; and t+u is greater than or equal to 3.

The preferred alkyl radicals R are methyl, ethyl, propyl, n-butyl, n-octyl and 2-ethylhexyl radicals. Preferably, at least 80% of the number of the radicals R are methyl radicals.

The radicals R' are advantageously selected from among:

(i) C$_1$–C$_{12}$ alkyl radicals, such as methyl, ethyl, n-propyl, isopropyl, n-butyl, 2-ethylhexyl, heptyl and dodecyl radicals;

(ii) C$_6$–C$_{12}$ aryl, alkylaryl and arylalkyl radicals, such as phenyl, benzyl and tolyl radicals; and (iii) C$_2$–C$_{12}$ alkoxyalkyl radicals, such as methoxymethyl, ethoxymethyl and 2-methoxyethyl radicals.

The more particularly preferred diorganopolysiloxanes of this invention are random or block polymers of formulae (1), (2) and (3) exhibiting at least one of the following characteristics:
R and R' are methyl;
r ranges from 5 to 50, inclusive;
s ranges from 2 to 20, inclusive; and
t+u ranges from 3 to 10, inclusive.

The preferred polymers according to the invention are generally in the form of more or less viscous oils having a viscosity ranging from 2 to 500,000 mPa.s, preferably ranging from 5 to 5,000, at 25° C.

The polymers according to the invention may advantageously be prepared by a first process (A), as follows:

In a first step (A$_1$), an itaconate of the formula:

$$CH_2=C(COOR')CH_2COOR' \qquad (4)$$

in which R' is defined as in formula (1) is added onto a hydroorganochlorosilane of the formula:

$$HSiR_aCl_{3-a} \qquad (5)$$

in which R and a are defined as in formula (1).
An addition product of the formula:

$$ZSiR_aCl_{3-a} \qquad (6)$$

in which R, a and Z are defined as in formula (1) is thus obtained. Z denotes the two isomeric forms produced depending on whether the silicon atom is bonded to one or the other of the two unsaturated carbon atoms.

Step (A₁) can be carried out in bulk, or in solution in an organic solvent. The reaction is exothermic. The operation is generally carried out under reflux of the reaction mixture at a temperature ranging from 60° to 140° C. for a period of time which generally ranges from 10 minutes to 3 hours.

The silane of formula (5) may be introduced into the itaconate of formula (4), or vice versa, or they may be introduced at the same time.

It is preferred to employ a molar excess (from 10% to 50%) of the silane of formula (5).

It is also preferred to conduct the reaction in the presence of a catalyst, in order to increase the reaction kinetics. The catalysts which may be used are those typically employed for carrying out a hydrosilylation reaction. Consequently, those which may be employed, in particular, are organic peroxides, UV radiations and catalysts based on a metal from the platinum group of the Periodic Table, in particular platinum, ruthenium and rhodium, in an amount of 20 to 500 ppm (calculated as the weight of metal) relative to the weight of the silane of formula (5).

Exemplary of such catalysts are platinum metal on carbon black, the platinum/olefin complexes described in U.S. Pat. Nos. 3,159,601 and 3,159,662, chloroplatinic acid, chloroplatinous acid, the complexes of platinum and a vinylpolysiloxane which are described in U.S. Pat. No. 3,419,593, the platinum complexes having an oxidation state close to zero which are described in U.S. Pat. Nos. 3,715,334, 3,775,452 and 3,814,730, and the complexes of platinum with an ethylenically unsaturated organic compound which are described in European Patents Nos. EP-A-No. 188,978 and EP-A-No. 190,530.

Upon completion of the reaction, the volatile materials are removed by vacuum distillation. A water vacuum pump generating 0.1 to 3 kPa is generally sufficient.

During a second step (A₂), the hydrolysis or cohydrolysis and the polycondensation of a silane of formula (6) are carried out.

This hydrolysis or cohydrolysis and polycondensation are preferably carried out in a liquid aqueous phase in an acidic medium (preferably HCl), or in a basic medium (preferably NH₄OH), under conditions similar to those employed for the hydrolysis of chlorosilanes, such as described on pages 193 to 200 of the text by Noll, *Chemistry and Technology of Silicones*, Academic Press (1968).

The concentration of acid or of base in water generally ranges from 10% to 30% by weight. The hydrolysis medium always includes at least 2 moles of water per mole of silane, typically from 10 to 100 moles of water. The hydrolysis may be carried out continuously or discontinuously at ambient temperature (20° C.), or at a temperature ranging from 5° to 90° C. The hydrolysis may be carried out at a pressure equal to or above atmospheric pressure, continuously or discontinuously, with, at least in the case of the continuous process, reinjection of water in order to maintain a constant aqueous phase.

In order to prepare polymers of formulae (2) and (3) or mixtures thereof, the silanes of formula (6) are hydrolyzed and polycondensed, optionally in the presence of a dichlorodiorganosilane of the formula:

$$R_2SiCl_2 \qquad (7)$$

in which R is as defined in formula (1) above.

The polycondensation may be terminated simply by neutralizing the reaction mixture. In this case, the polymers of formula (2) which are obtained are blocked at each of their polymer ends by a hydroxyl group or by the unit $R_2ZSiO_{0.5}$ if the silane $R_2ZSiCl$ is employed.

The polycondensation can also be terminated by adding an organosilicon compound capable of reacting with the terminal hydroxyl groups, such as the compounds of the formulae:

$$R_3SiCl; \; R_3SiNHSiR_3 \; \text{and} \; R_3SiOSiR_3$$

in which the radicals R are as defined in formula (1) above.

The period of hydrolysis may range from a few seconds to several hours.

After hydrolysis, the aqueous phase is separated from the siloxane phase by any suitable physical means, generally by phase separation and extraction with an organic solvent such as isopropyl ether.

The siloxane phase may be subsequently washed with water and then distilled, if desired, to separate the linear polymers of formula (2) from the cyclic polymers of formula (3).

To prepare the polymers of formulae (1), (2) and (3) according to a second process (B) of the invention, it is also possible to use the corresponding polymer as a starting material in which all of the radicals Z are hydrogen atoms, and to then add an itaconate of formula (4) above by means of a hydrosilylation reaction.

This polymer is referred to in the description that follows as the "polymer containing SiH"; the SiH groups may be present within the polymer chain and/or at the ends of a polymer chain. These polymers containing SiH are well known to the silicone industry and are generally commercially available.

They are described, for example, in U.S. Pat. Nos. 3,220,972, 3,436,366, 3,697,473 and 4,340,709.

This polymer containing SiH can therefore be represented by the formula:

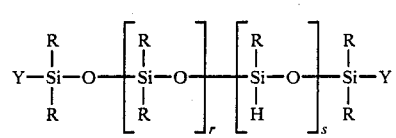

(8)

in which R, r and s are as defined above in the case of formula (2) and the radicals Y, which may be identical or different, are each a radical R or a hydrogen atom; and by the formula:

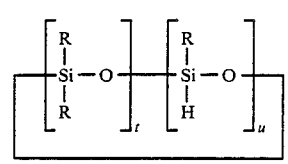

(9)

in which R, t and u are as defined above in the case of formula (3).

As in step (A₁) of the process (A), the process (B) therefore employs a similar hydrosilylation reaction, and it is desirable to carry out this reaction using the same catalysts as those outlined in step (A).

This reaction may be carried out in bulk or in an organic solvent at a temperature ranging from normal temperature (25° C.) to 170° C.

The volatile materials are removed upon completion of the reaction by vacuum distillation and/or by extraction.

Process (A) makes it possible to prepare polymers of formula (2) containing hydroxyl endgroups and polymers of formulae (2) and (3) containing radicals R, some of which may be vinyl radicals.

Process (B) makes it possible to prepare polymers of well-defined structure by judicious selection of the starting polymers containing SiH.

The polymers of formula (1), (2) and (3) have many industrial applications. They can be used, in particular, as a lubricant for rigid or plasticized PVC (polyvinyl chloride) in a proportion of 0.01 to 2 parts by weight, preferably from 0.05 to 1 part by weight, of polymer per 100 parts by weight of PVC resin.

Indeed, the polymers of formulae (1), (2) and (3), while technically incompatible, exhibit sufficient compatibility with PVC as not to "bloom" and thus provide a sufficient lubricating action.

The polymers of formulae (1), (2) and (3) can also be used as hydraulic fluids.

In order to further illustrate the present invention and the advantages thereof, the following specific examples are given, it being understood that same are intended only as illustrative and in nowise limitative.

EXAMPLE 1

907 g, i.e., 5.74 moles of methyl itaconate and 129 mg of chloroplatinic acid ($H_2PtCl_6$) were charged into a 2-liter three-necked reactor equipped with a condenser, a stirrer and a dropping funnel.

The temperature was increased to 116° C. and 792.5 g (6.89 moles) of $CH_3HSiCl_2$, i.e., a 20% molar excess relative to the itaconate, were then introduced over 65 minutes.

Since the reaction was exothermic, the temperature remained in the region of 120° C. without any additional heat input. At the end of addition, the temperature was 112° C. The reaction mixture was maintained under reflux for 1 hour, 50 minutes, the excess $CH_3HSiCl_2$ was then distilled off and 1,274 g of a liquid adduct whose boiling point was 80° C. at 0.13 kPa were obtained. The weight yield of adduct was 71%.

NMR analysis of the addition product evidenced that it contained approximately 60 mol % of -$CH_2CH(COOCH_3)CH_2$-$COOCH_3$ radicals and 40 mol % of -$C(CH_3)(COOCH_3)CH_2COOCH_3$ units.

EXAMPLE 2

340 g of an aqueous solution of ammonia $NH_4OH$ at 20% by weight and 370 ml of water were charged into the same three-necked reactor as that employed in Example 1. 500 g (1.83 mole) of the adduct obtained in Example 1, dissolved in 500 ml of isopropyl ether, were then introduced over 50 minutes, the temperature being maintained at 25° C.

When the hydrolysis was complete, the mother liquors were separated off and 500 ml of isopropyl ether were added again to promote the phase separation. The separated organic solution was washed with water again, was dried and was stripped up to a temperature of 100° C. under a vacuum of 2 kPa.

323 g of a clear oil were then obtained, having a hydroxyl group content of 1.8% by weight, a viscosity of 35 mPa.s at 25° C. and a weight percentage of ester functional groups of 54.2%.

EXAMPLE 3

2,800 g of water were charged into a 10-liter three-necked reactor, and 903 g (7 moles) of $(CH_3)_2SiCl_2$ and 98 g (0.35 mole) of the adduct produced in Example 1 were then introduced over one hour. During the addition, the temperature increased gradually from 15° to 65° C. After the addition, the reaction mixture was maintained stirred for 30 minutes and the acidic water was separated off. 350 ml of isopropyl ether were added, three washings were carried out and the ethereal solution was concentrated in a first stage up to 100° C. at atmospheric pressure and then up to 80° C. under a vacuum of 2.5 kPa.

456 g of a clear and colorless oil which had the following characteristics were then obtained:

| | | |
|---|---|---|
| (i) | Viscosity at 25° C. | 20 mPa.s; |
| (ii) | % (by weight) of hydroxyl groups | 1%; |
| (iii) | Weight percentage of ester functional group | 4.8%; |
| (iv) | Weight yield of oil | 77%. |

EXAMPLE 4

Into a 5-liter three-necked reactor were charged 816 g of an oil of the formula:

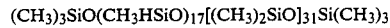

and 948 g of methyl itaconate, all in 1,540 g of xylene, together with chloroplatinic acid in such amount that there were approximately 150 ppm of platinum metal relative to the weight of siloxane polymer. The temperature was increased to 145° C. and the medium was maintained at this temperature for 24 hours. The xylene and the excess methyl itaconate were then distilled off by heating to 140.C under a vacuum of 2.5 kPa.

1,370 g of a clear and colorless oil were then obtained, having a viscosity of 950 mPa.s at 25° C. and a weight percentage of ester functional groups of 28.2%.

EXAMPLE 5

The following materials were charged at the same time into a one-liter reactor fitted with a condenser and a stirrer:

(i) 174 g, i.e., 1.1 mole of methyl itaconate;

(ii) 46 g of a cyclic hydromethylsiloxane of 92% purity, of the formula:

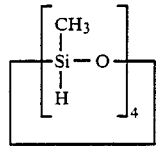

(iii) 25 mg of $H_2PtCl_6$ ($6H_2O$).

The reaction mixture was heated to 135° C. and the temperature was maintained at a temperature of from 135° to 160° C. for 1 hour, 30 minutes.

The excess methyl itaconate was distilled off by heating the reaction mixture to 160° C. at 0.133 kPa. 146 g of devolatilized oil, orange-yellow in color, were obtained, having a viscosity of 2,240 mPa.s at 25° C., in which the weight percentage of ester was 50%.

The mass spectrum and the UV spectrum (CHCl$_3$) confirmed that the oil produced was indeed the compound of the formula:

$$\left[ \begin{array}{c} CH_3 \\ | \\ -Si-O- \\ | \\ Z \end{array} \right]_4$$

with Z being an itaconyl radical.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A diorganopolysiloxane comprising at least one recurring structural unit of the formula (1):

$$ZR_aSiO_{\frac{3-a}{2}} \quad (1)$$

in which a is 1 or 2; the symbol Z is one of the radicals —CH$_2$CH(COOR')CH$_2$COOR' or —C(CH$_3$)(COOR')CH$_2$COOR'; the symbols R, which may be identical or different, are each a C$_1$–C$_{20}$ alkyl, vinyl, phenyl or 3,3,3-trifluoropropyl radical, and, where a=2, one of the radicals R may be a hydroxyl group; and the symbols R', which may be identical or different, are each a C$_1$–C$_{12}$ monovalent hydrocarbon radical or a C$_2$–C$_{12}$ monovalent alkoxyalkyl radical.

2. The diorganopolysiloxane as defined by claim 1, further comprising a siloxy recurring structural unit of the formula (1'):

$$R_bSiO_{\frac{4-b}{2}} \quad (1')$$

in which R is as defined in formula (1) and b is 2 or 3.

3. The diorganopolysiloxane as defined by claim 1, having the formula (2):

$$Z'-\underset{\underset{R}{|}}{\overset{\overset{R}{|}}{Si}}-O-\left[\underset{\underset{R}{|}}{\overset{\overset{R}{|}}{Si}}-O\right]_r\left[\underset{\underset{Z}{|}}{\overset{\overset{R}{|}}{Si}}-O\right]_s\underset{\underset{R}{|}}{\overset{\overset{R}{|}}{Si}}-Z' \quad (2)$$

in which the symbols R and Z are as defined in formula (1); the symbols Z', which may be identical or different, are each a radical R or Z; r is an integer ranging from 0 to 500; s is an integer ranging from 0 to 50, and, if s is 0, at least one of the symbols Z' is Z.

4. The diorganopolysiloxane as defined by claim 1, having the formula (3):

$$\left[\underset{\underset{R}{|}}{\overset{\overset{R}{|}}{-Si}}-O-\right]_t\left[\underset{\underset{Z}{|}}{\overset{\overset{R}{|}}{-Si}}-O-\right]_u \quad (3)$$

in which R and Z are as defined in formula (1); u is an integer ranging from 1 to 20; t is an integer ranging from 0 to 20; and t+u is greater than or equal to 3.

5. The diorganopolysiloxane as defined by claim 1, wherein the radicals R are methyl, ethyl, propyl, n-butyl, n-octyl or 2-ethylhexyl radicals.

6. The diorganopolysiloxane as defined by claim 1, wherein the radicals R' are C$_1$–C$_{12}$ alkyl radicals; C$_6$–C$_{12}$ aryl, alkylaryl or arylalkyl radicals; or C$_2$–C$_{12}$ alkoxyalkyl radicals.

7. The diorganopolysiloxane as defined by claim 3, wherein R and R' are methyl radicals; r ranges from 5 to 50; and s ranges from 2 to 20.

8. The diorganopolysiloxane as defined by claim 4, wherein R and R' are methyl radicals; and t+u ranges from 3 to 10.

9. The diorganopolysiloxane as defined by claim 1, having a viscosity ranging from 2 to 500,000 mPa.s at 25° C.

10. The diorganopolysiloxane as defined by claim 9, having a viscosity ranging from 5 to 5,000 mPa.s at 25° C.

11. A composition of matter comprising polyvinyl chloride and a lubricating amount of the diorganopolysiloxane as defined by claim 1.

12. A hydraulic fluid comprising the diorganopolysiloxane as defined by claim 1.

* * * * *